US010672191B1

(12) United States Patent
Besecker et al.

(10) Patent No.: US 10,672,191 B1
(45) Date of Patent: Jun. 2, 2020

(54) TECHNOLOGIES FOR ANCHORING COMPUTER GENERATED OBJECTS WITHIN AUGMENTED REALITY

(71) Applicant: Marxent Labs, LLC, Miamisburg, OH (US)

(72) Inventors: Bret Besecker, Safety Harbor, FL (US); Barry Besecker, Xenia, OH (US); Ken Moser, Springboro, OH (US)

(73) Assignee: Marxent Labs LLC, Miamisburg, OH (US)

( * ) Notice: Subject to any disclaimer, the term of this patent is extended or adjusted under 35 U.S.C. 154(b) by 16 days.

(21) Appl. No.: 16/036,140

(22) Filed: Jul. 16, 2018

Related U.S. Application Data

(60) Provisional application No. 62/532,678, filed on Jul. 14, 2017.

(51) Int. Cl.
 *G06T 19/00* (2011.01)

(52) U.S. Cl.
 CPC ...... *G06T 19/006* (2013.01); *G06T 2219/008* (2013.01)

(58) Field of Classification Search
 CPC .......... G06T 19/006; G06T 2219/2004; G06K 9/00624–00704; G06F 3/048
 See application file for complete search history.

(56) References Cited

U.S. PATENT DOCUMENTS

| | | | | |
|---|---|---|---|---|
| 2013/0141419 A1* | 6/2013 | Mount | ................... | G06F 3/011 345/419 |
| 2015/0243071 A1* | 8/2015 | Jovanovic | .............. | G06Q 50/01 345/427 |
| 2015/0331970 A1* | 11/2015 | Jovanovic | .............. | G06T 15/20 703/1 |
| 2016/0148433 A1* | 5/2016 | Petrovskaya | ......... | G06T 19/006 345/633 |

(Continued)

OTHER PUBLICATIONS

Nuernberger, Benjamin, et al. "Snaptoreality: Aligning augmented reality to the real world." Proceedings of the 2016 CHI Conference on Human Factors in Computing Systems. ACM, 2016. (Year: 2016).*

(Continued)

*Primary Examiner* — Daniel F Hajnik
(74) *Attorney, Agent, or Firm* — Ice Miller LLP

(57) ABSTRACT

Devices, systems, and methods may implement one or more techniques for anchoring computer generated objects within an augmented reality scene. One or more techniques may include capturing an image frame via a camera sensor, for example. One or more techniques may include determining a ground plane of the image frame and/or identifying a wall plane of the image frame. One or more techniques may include generating a model of a guide reticle and/or linking a virtual tether connecting the guide reticle to a digital object to be rendered relative to the guide reticle. One or more techniques may include rendering the guide reticle and the virtual tether to a display of, for example, a mobile image (Continued)

capture computing device relative to the wall plane and the ground plane. One or more techniques may include rendering the digital object to the display relative to the guide reticle and the virtual tether.

16 Claims, 13 Drawing Sheets

(56) References Cited

U.S. PATENT DOCUMENTS

2017/0287218 A1* 10/2017 Nuernberger ......... G06T 19/006
2018/0122043 A1* 5/2018 Energin .............. G06F 3/04845

OTHER PUBLICATIONS

NPL Video Titled: "SnapToReality: Aligning Augmented Reality to the Real World" available for viewing at: https://www.youtube.com/watch?v=phlmnaIVQOQ, published May 2016, select screenshots included. (Year: 2016).*

Orr, "Area Macy's Store Adds Virtual reality Technology," https://www.ibj.com/blogs/19-property-lines/post/71071-area-macys-store-adds-virtual-reality-technology?utm_source=ibj-daily&utm_medium=newsletter&utm_campaign=2018-10-26, Oct. 26, 2018, 4 pages.

* cited by examiner

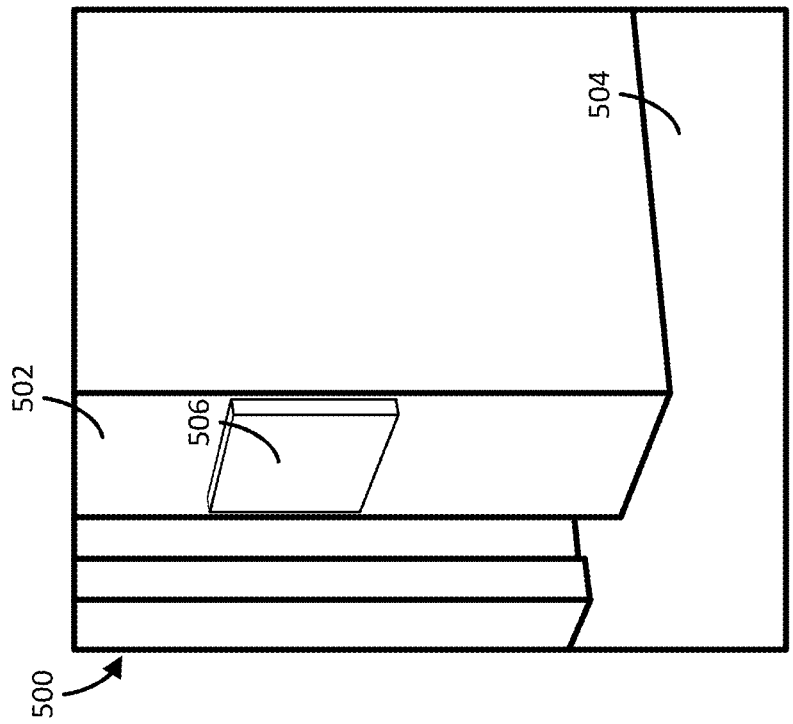
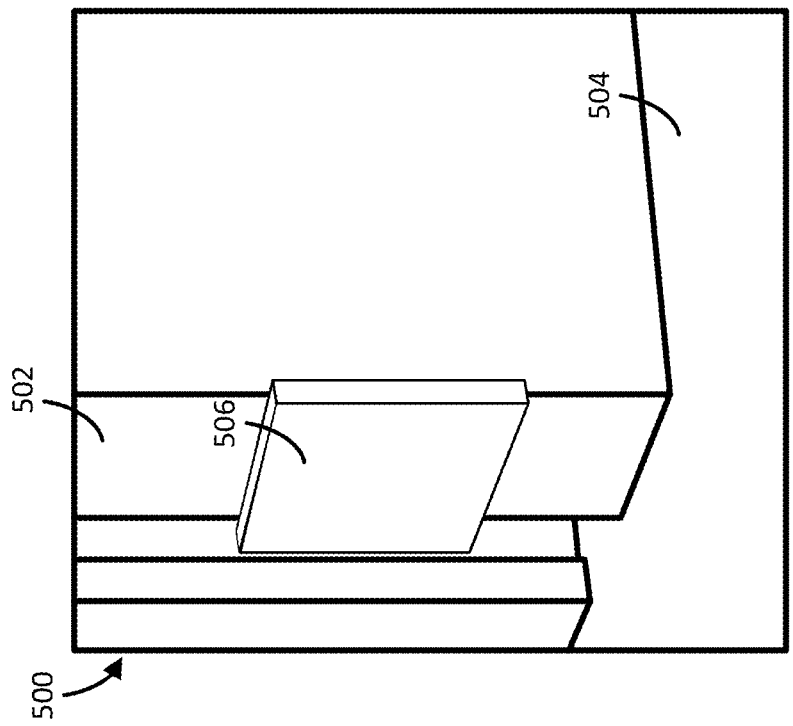

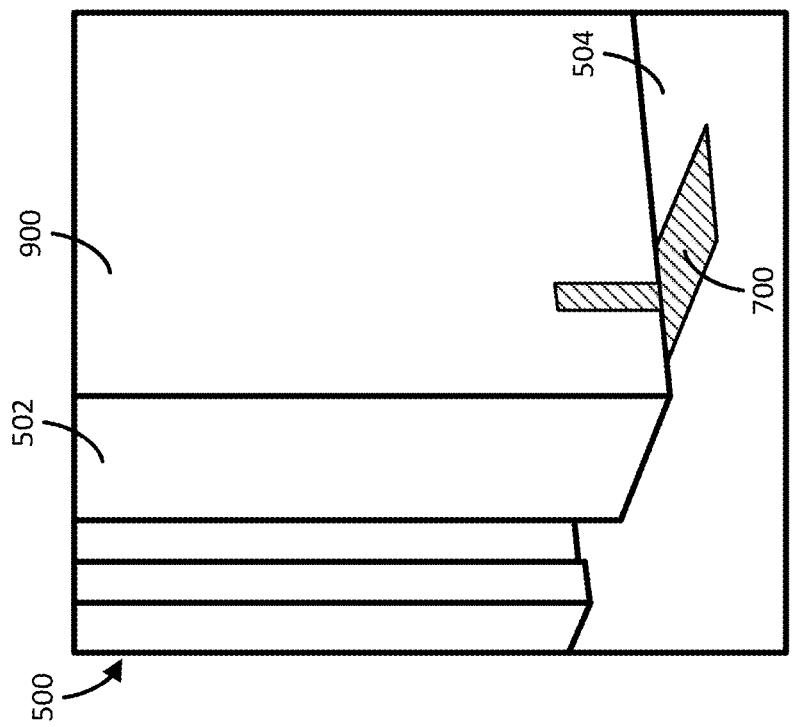
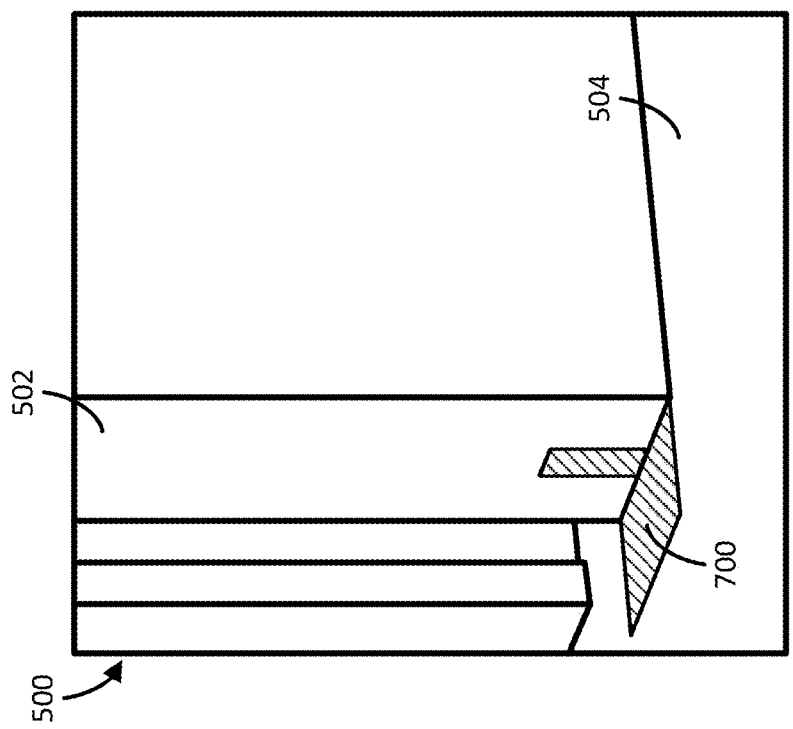
FIG. 9B
FIG. 9A

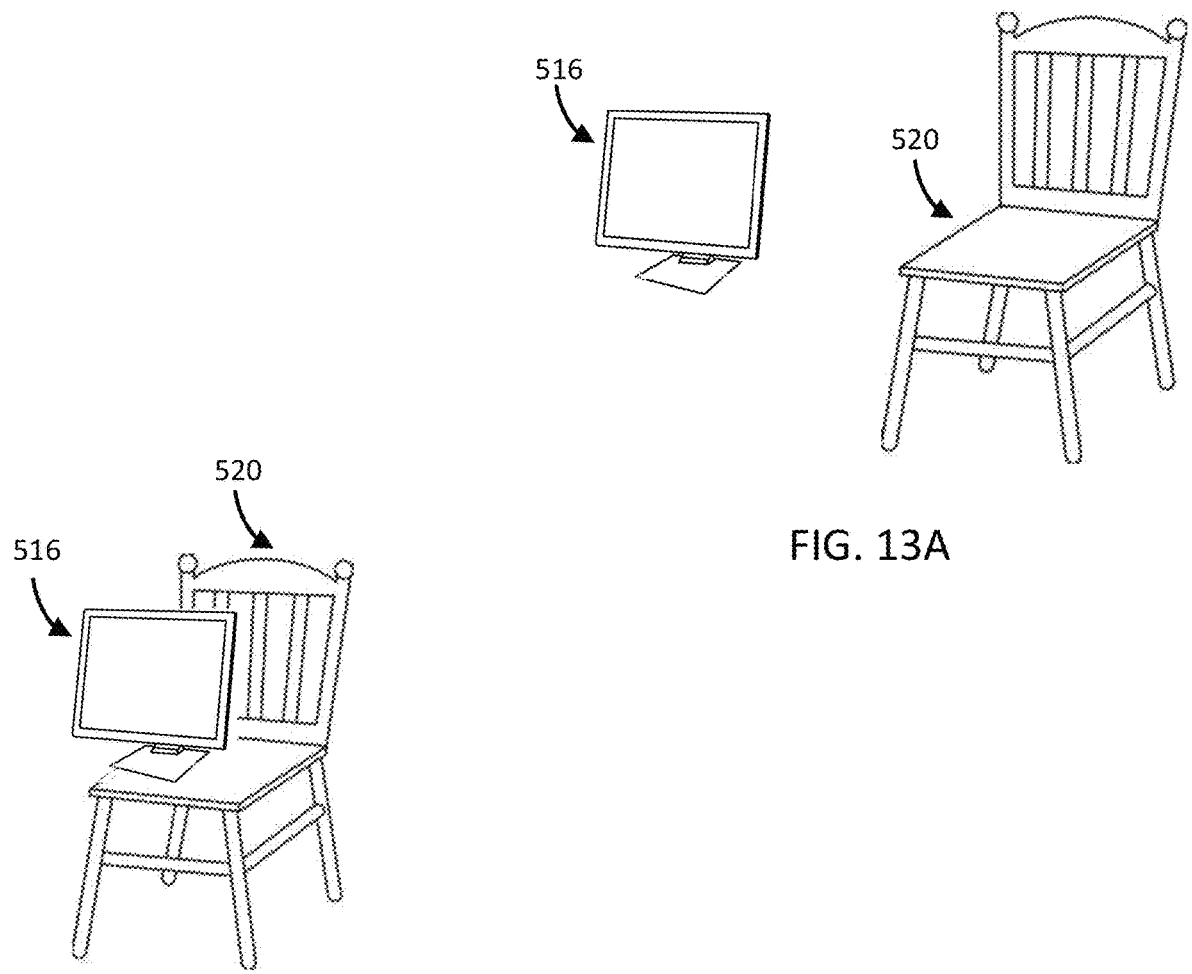
FIG. 13A
FIG. 13B
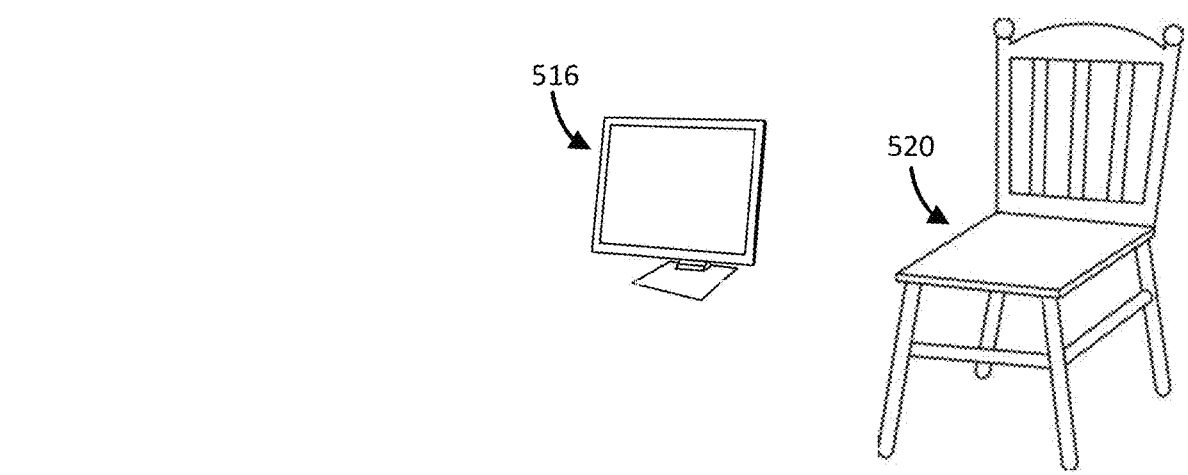
FIG. 13C

TECHNOLOGIES FOR ANCHORING COMPUTER GENERATED OBJECTS WITHIN AUGMENTED REALITY

CROSS-REFERENCE TO RELATED APPLICATIONS

This application claims the benefit of U.S. Provisional Patent Application No. 62/532,678, filed on Jul. 14, 2017, the contents of which being incorporated by reference in its entirety herein, for all purposes.

BACKGROUND

Advancements in electrical component design and fabrication have resulted in computing hardware becoming smaller and smaller, allowing them to fit in smaller, more compact form factors. In turn, those smaller computing hardware components have been integrated into mobile computing devices, including smartphones, tablets, wearables, etc. Such components include touchscreen displays, various sensors (e.g., proximity sensors, light sensors, barometers, accelerometers, magnetometers, gyroscopes, etc.), cameras, wireless communication interfaces, etc.

As a result, mobile computing devices have become seemingly ubiquitous. Technologies have emerged to leverage the components of the computing devices. One such technology is computer-mediated reality and augmented reality. Computer-mediated reality manipulates the perception of a user's environment by adding information to or subtracting information from the environment through the use of a mobile computing device. Augmented reality blends a user's environment with digital information (e.g., virtual objects, computer generated content, etc.), generally in real time. In other words, the digital information is embedded, or overlays, the actual environment.

However, placement of such computer generated content into an image of an augmented reality scene, such that it appears to be in direct contact with real physical planar surfaces, is non-trivial due to a lack of context with respect to the size, height, and distance of the computer generated content relative to a view of the camera from which the image was captured. Using data collected from a depth camera (e.g., an RGB-D camera, a ranging camera, a time-of-flight (ToF) camera, etc.), for example, in which RGB information is accompanied with per-pixel depth information, determining the intersection between computer generated content and physical objects can be rather trivial, since the depth and surface structure of physical surroundings relative to the camera is explicitly known. Within standard RGB imagery, however, there is no inherent ground-truth information to determine the position and orientation of computer generated content relative to either the imaging camera or physical surfaces within the image itself.

SUMMARY

One or more devices, systems, methods, may implement one or more techniques for anchoring computer generated objects within an augmented reality scene. One or more techniques may include capturing, by a mobile image capture computing device, an image frame via a camera sensor of the mobile image capture computing device. One or more techniques may include determining, by the mobile image capture computing device, a ground plane of the image frame. One or more techniques may include identifying, by the mobile image capture computing device, a wall plane of the image frame. One or more techniques may include generating, by the mobile image capture computing device, a model of a guide reticle. One or more techniques may include linking, by the mobile image capture computing device, a virtual tether connecting the generated model of the guide reticle to a digital object to be rendered relative to the generated model of the guide reticle. One or more techniques may include rendering, by the mobile image capture computing device, the guide reticle and the virtual tether to a display of the mobile image capture computing device relative to the identified wall plane and the determined ground plane. One or more techniques may include rendering, by the mobile image capture computing device, the digital object to the display relative to the guide reticle and the virtual tether.

In some embodiments, rendering the guide reticle relative to the identified wall plane comprises aligning the guide reticle relative to the wall plane. In some embodiments, determining the approximate orientation of the ground plane of the image frame comprises identifying an approximate orientation of the ground plane relative to the camera sensor at a time at which the image frame was captured. In some embodiments, rendering the guide reticle relative to the identified wall plane comprises adjusting a height of the digital object relative to the ground plane.

In some embodiments, the method further comprises determining an intersection line between the identified wall plane and the determined ground plane, wherein generating the model of a guide reticle comprises generating the model of a guide reticle as a function of the intersection line. In some embodiments, identifying the wall plane of the image frame comprises identifying the wall plane as a function of one or more line and plane detection computer vision algorithms on data of the image frame.

In some embodiments, the guide reticle may be a first guide reticle, the virtual tether may be a first virtual tether, the digital object may be a first digital object, and the wall plane may be a first wall plane. The mobile image capture computing device may determine a surface plane of a surface of a second digital object. The mobile image capture computing device may identify a second wall plane of the image frame. The mobile image capture computing device may generate a model of a second guide reticle. The mobile image capture computing device may link a second virtual tether connecting the second guide reticle to the second digital object to be rendered relative to the second guide reticle. The mobile image capture computing device may render the second guide reticle and the second virtual tether to the display of the mobile image capture computing device relative to the second wall plane and the surface plane. The mobile image capture computing device may render the second digital object to the display relative to the second guide reticle and the second virtual tether.

In some embodiments, the mobile image capture computing device may receive input to render the first digital object in connection with the surface plane to the display of the mobile image capture computing device. The mobile image capture computing device may determine that the rendering of the first digital object in connection with the surface plane to the display is at least one of: permissible, or impermissible. The mobile image capture computing device may render the first digital object in connection with the surface plane to the display of upon a permissible determination.

One or more devices, systems, methods, may implement one or more techniques for anchoring computer generated objects within an augmented reality scene. One or more techniques may include capturing, by a mobile image capture computing device, an image frame via a camera sensor of the mobile image capture computing device. One or more techniques may include rendering, by the mobile image capture computing device, a first digital object and a second digital object within the image frame to a display of the mobile image capture computing device. One or more techniques may include receiving, by the mobile image capture computing device, input to render the first digital object in connection with the second digital object within the image frame to the display of the mobile image capture computing device. One or more techniques may include determining, by the mobile image capture computing device, that the rendering of the first digital object in connection with the second digital object is at least one of: permissible, or impermissible. One or more techniques may include overriding the input and rendering, by the mobile image capture computing device, the first digital object out of connection with the second digital object within the image frame to the display of the mobile image capture computing device upon an impermissible determination.

BRIEF DESCRIPTION OF DRAWINGS

The embodiments and other features, advantages and disclosures contained herein, and the manner of attaining them, will become apparent and the present disclosure will be better understood by reference to the following description of various example embodiments of the present disclosure taken in conjunction with the accompanying drawings, wherein:

FIGS. 5A and 5B are an illustration of a digital object superimposed on an image in which the digital object is rendered in an augmented reality scene to appear closer and further away, respectively, from the camera sensor of the mobile image capture device of FIG. 1;

FIGS. 9A and 9B are illustrative computer generated depictions of the ground plane shown relative to the wall plane in an augmented reality scene;

FIGS. 13A-13C are illustrative representations of an association technique of a digital object with one or more other digital objects.

DETAILED DESCRIPTION

Figure 1:
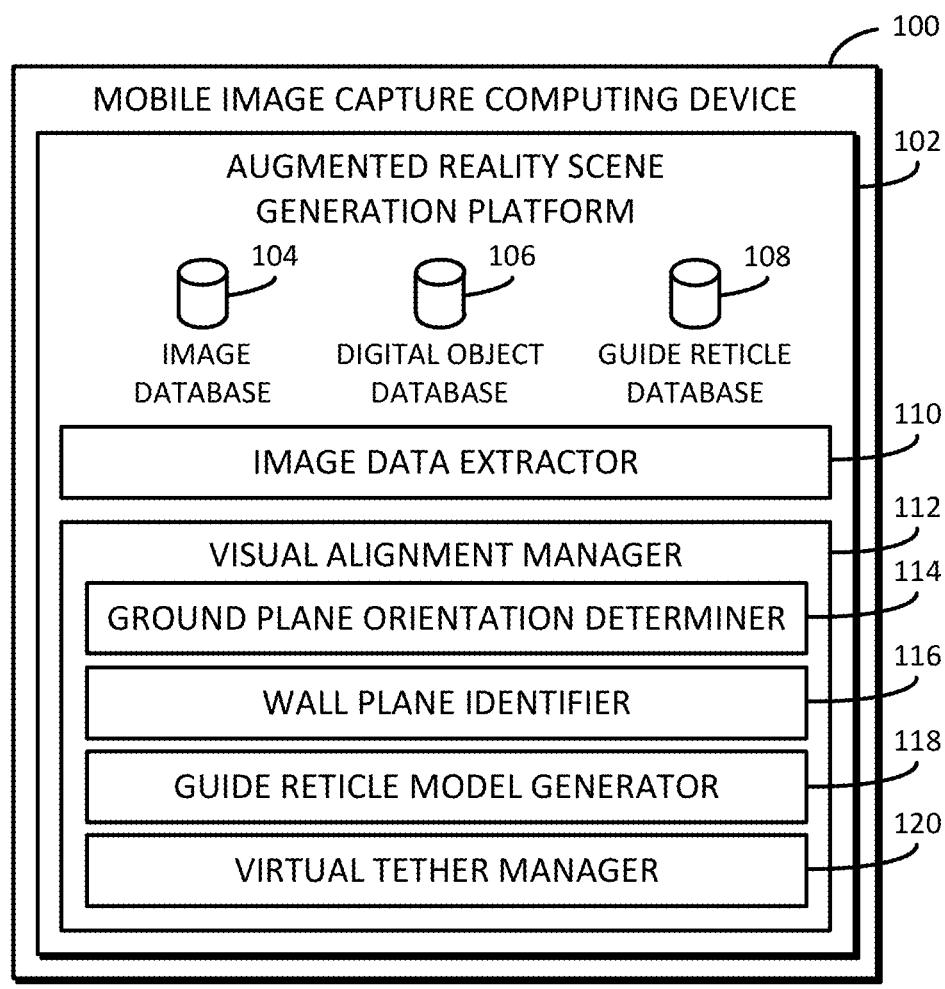
FIG. 1 is a simplified block diagram of at least one embodiment of an environment that may be established by an augmented reality scene generation platform of a mobile image capture device for anchoring computer generated objects within an augmented reality scene.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

System, devices, and/or methods that implement techniques, and/or technologies for anchoring computer generated objects within an augmented reality scene, perhaps for example without the use of pre-defined and/or runtime generated feature maps or additional hardware (e.g., depth measuring sensors), may be useful.

FIG. 1 is an illustrative mobile image capture device 100 for positional anchoring of computer generated geometry within augmented reality, which may be rendered via the mobile image capture computing device 100. In use, the mobile image capture device 100 is configured to capture images (e.g., image frames of a video stream) and/or detect/generate data (e.g., freedom of movement) usable to determine a pose estimation for the mobile image capture device 100 relative to an initial arbitrary frame of reference. The tracking of the pose of the mobile image capture device 100 is performed iteratively over each subsequent image frame of a video captured by the mobile image capture device 100 based on the analysis of data corresponding to sequential image frames.

Figure 4:
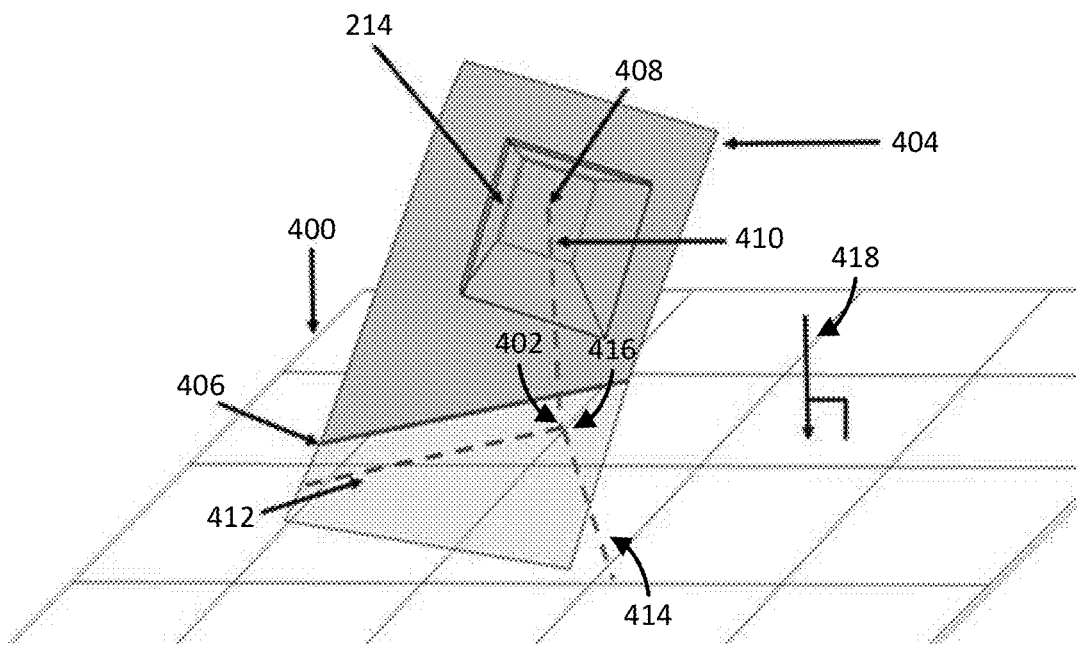
FIG. 4 is a simplified block diagram of a depiction of an arbitrary coordinate frame formed around a common rotational frame (e.g., the camera sensor of the mobile image capture device of FIG. 2) relative to a ground plane and perpendicular to gravity.

Such analysis data includes image data (e.g., resolution data, field of view (FOV) data, focal length data, imaging center data, etc.), which can be extracted from a camera sensor (e.g., the camera sensor 214) usable to capture images, as well as image data determinable from the image itself. From the image data, the mobile image capture device 100, or other image processing/rendering device, perhaps for example depending on the embodiment(s), may form a new coordinate system arbitrarily aligned in relation to the physical world (e.g., the illustrative camera sensor 214 with an arbitrary position and/or orientation relative to a ground plane 400 as shown in FIG. 4).

As will be described in further detail below, the mobile image capture device 100 is configured to employ a visual alignment manager (e.g., the visual alignment manager 114) which is usable to supply missing scale and/or positional context, as well as guide the placement of digital objects (e.g., virtual objects, computer generated content, etc.), such that the digital objects visually appear to be flush with planar physical surfaces within a standard image (e.g., an RGB image) of an augmented reality scene. The visual alignment manager may be configured to generate a model of an intersection line between two physical planes (e.g., a primary plane and/or a secondary plane) which describe the location of the digital object(s) within a standard image of an augmented reality scene, referred to herein as a "guide reticle."

The primary plane (e.g., the ground/floor plane) can be estimated from the orientation of the mobile image capture device 100, such as may be estimated using position/orientation data extracted from an IMU sensor (e.g., the IMU sensor 216), or through other tracking mechanisms. The secondary plane denotes the inclination of the mounting surface of the digital objects that are to be aligned with the wall surface. The guide reticle itself is an annotated representation of the intersection line produced by these primary and secondary planes. The guide reticle can then be superimposed over the real intersection between the ground and wall surfaces as is visible within the image.

In some embodiments, perhaps for example once the guide reticle is aligned with the actual ground, wall intersection line within the image, the position, orientation, and/or scale information that may be useful (e.g., may be required) to align the digital object(s) with the wall can be readily obtained from the guide reticle's pose. This information can then be used to update the position and/or orientation of the digital object(s) in order to produce the desired rendering perspective within the displayed augmented reality scene. Accordingly, unlike present technologies, the procedure might not (e.g., does not) require any prior knowledge of pre-defined or runtime generated feature maps or additional hardware (e.g., depth measuring sensors).

The mobile image capture device 100 may be embodied as any type of camera-equipped portable computing device capable of performing the functions described herein. Specifically, the mobile image capture device 100 may be embodied as any type of camera-equipped portable computing device that uses mobile-specific hardware and/or software components for operating and/or executing on a mobile architecture. Illustrative examples of such mobile image capture device 100 may include, but are not limited to, smartphones, wearables (e.g., smartwatches, smart glasses, etc.), tablets, laptops, etc. Accordingly, the mobile image capture device 100 may include any type of firmware, hardware, software, circuitry, or combination thereof capable of performing the functions described herein.

Figure 2:
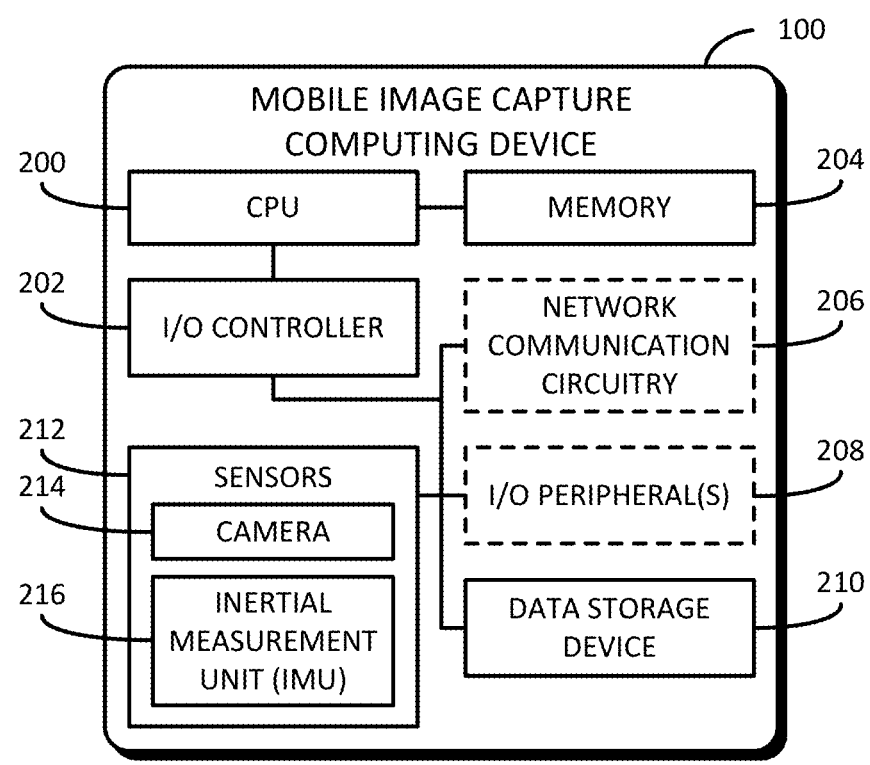
FIG. 2 is a simplified block diagram of at least one embodiment of the mobile image capture device of FIG. 1 that includes a camera sensor.

Referring now to FIG. 2, an illustrative mobile image capture device 100 includes a central processing unit (CPU) 200, an input/output (I/O) controller 202, a memory 204, a data storage device 210, and/or various sensors 212, as well as, in some embodiments, a network communication circuitry 206 and/or one or more I/O peripherals 208. One or more embodiments may include additional, fewer, and/or alternative components to those of the illustrative mobile image capture device 100, such as a graphics processing unit (GPU). One or more of the illustrative components may be combined on a single system-on-a-chip (SoC) on a single integrated circuit (IC). The type of components of the respective mobile image capture device 100 may be predicated upon the type and/or intended use of the respective mobile image capture device 100.

The CPU 200, or processor, may be embodied as any combination of hardware and/or circuitry capable of processing data. In some embodiments, the mobile image capture device 100 may include more than one CPU 200. Perhaps for example depending on the embodiment(s), the CPU 200 may include one processing core (not shown), such as in a single-core processor architecture, or multiple processing cores (not shown), such as in a multi-core processor architecture. Irrespective of the number of processing cores and/or CPUs 200, the CPU 200 is capable of reading and/or executing program instructions. In some embodiments, the CPU 200 may include cache memory (not shown) that may be integrated directly with the CPU 200 or placed on a separate chip with a separate interconnect to the CPU 200. In some embodiments, pipeline logic may be used to perform software and/or hardware operations (e.g., image processing operations, network traffic processing operations), rather than commands issued to/from the CPU 200.

The I/O controller 202, or I/O interface, may be embodied as any type of computer hardware and/or combination of circuitry capable of interfacing between input/output devices and the mobile image capture device 100. Illustratively, the I/O controller 202 is configured to receive input/output requests from the CPU 200, and/or send control signals to the respective input/output devices, thereby managing the data flow to/from the mobile image capture device 100.

The memory 204 may be embodied as any type of computer hardware or combination of circuitry capable of holding data and/or instructions for processing. Such memory 204 may be referred to as main or primary memory. In some embodiments, one or more components of the mobile image capture device 100 may have direct access to memory, such that certain data may be stored via direct memory access (DMA) independently of the CPU 200.

In such embodiments in which the mobile image capture device 100 includes network communication circuitry 206, the network communication circuitry 206 may be embodied as any type of computer hardware or combination of circuitry capable of managing network interfacing communications (e.g., messages, datagrams, packets, etc.) via wireless and/or wired communication modes. In some embodiments, the network communication circuitry 206 may include a network interface controller (NIC) capable of being configured to connect the mobile image capture device 100 to a computer network, as well as other devices.

The one or more I/O peripherals 208 may be embodied as any auxiliary device configured to connect to and/or communicate with the mobile image capture device 100. For example, the I/O peripherals 208 may include, but are not limited to, a mouse, a keyboard, a monitor, a touchscreen, a printer, a scanner, a microphone, a speaker, etc. Some I/O devices may be capable of one function (e.g., input or output), or both functions (e.g., input and/or output).

In some embodiments, the I/O peripherals 208 may be connected to the mobile image capture device 100 via a cable (e.g., a ribbon cable, a wire, a universal serial bus (USB) cable, a high-definition multimedia interface (HDMI) cable, etc.) of the mobile image capture device 100. In such embodiments, the cable may be connected to a corresponding port (not shown) of the mobile image capture device 100 for which the communications made there between can be managed by the I/O controller 202. In one or more embodiments, the I/O peripherals 208 may be connected to the mobile image capture device 100 via a wireless mode of communication (e.g., Bluetooth®, Wi-Fi®, etc.) which can be managed by the network communication circuitry 206.

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary and/or secondary storage, and/or may be used to store a large amount of data relative to the data storage capacity of the memory 204 described above.

The illustrative sensors 212 include a camera sensor 214 and/or an inertial measurement unit (IMU) sensor 216. In one or more embodiments, the sensors 212 may include one or more additional sensors 212. The camera sensor 214 may be embodied as an type of camera sensor (e.g., complementary metal-oxide-semiconductor (CMOS), charge-coupled device (CCD), hybrid CCD/CMOS, etc.) capable of capturing different types of scene data, such as color image data (RGB), color and/or depth image data (RGBD camera), depth sensor, stereo camera (L/R RGB), YUV, GRAY scale, or any other camera sensor technology that can generate digital image frames. In one or more embodiments, the camera sensor 214 is operable to produce digital image frames (e.g., image capture frequency) at a rate of at least 15 frames per second (fps) and/or a resolution of at least 320×240 pixels.

The IMU sensor 216 may include one or more software or hardware gyroscopes to measure the orientation of the mobile image capture device 100 (e.g., a 3-axis gyroscope), accelerometers to measure proper acceleration of the mobile image capture device 100 (e.g., a 3-axis accelerometer), magnetometers to measure the direction of the Earth's magnetic field relative to the mobile image capture device 100 (e.g., a 3-axis magnetometer), or any other type of inertial motion measurement software/hardware usable to perform the functions described herein (e.g., measure motion along three perpendicular linear axes and/or the rotation around each of the three perpendicular linear axes). In one or more embodiments, the IMU sensor 216 provides digital information at a sampling rate of at least 15 Hz, or a sampling rate equivalent to the image capture frequency and/or describes a 3-axis rotation, translation acceleration, and/or rotational acceleration, perhaps in addition to a single-axis down or gravity vector (e.g., a vector describing the direction of gravitational acceleration with respect to a local coordinate frame of the IMU sensor 216).

Referring back to FIG. 1, an illustrative mobile image capture device 100 is shown which includes an augmented reality scene generation platform 102. The augmented reality scene generation platform 102 may include any type of firmware, hardware, software, circuitry, or combination thereof, as may be useful to (e.g. required to) perform the functions described herein. In some embodiments, one or both of the image data extractor 110 and the visual alignment manager 112 may be embodied as virtualized hardware components, software, or emulated architecture, which may be established and/or maintained by the one or more processors 200 and/or other components of the mobile image capture device 100. One or both of the image data extractor 110 and the visual alignment manager 112 may form a portion of the one or more of the processor(s) 200, the I/O controller 202, and/or other components of the mobile image capture device 100.

In some embodiments, the augmented reality scene generation platform 102 may include one or more computer-readable medium (e.g., the memory 204, the data storage device 210, and/or any other media storage device) having instructions stored thereon and/or one or more processors (e.g., the CPU 200) coupled with the one or more computer-readable medium and/or configured to execute instructions to perform the functions described herein. The illustrative augmented reality scene generation platform 102 includes an image data extractor 110 and/or a visual alignment manager 112, each of which may be embodied as hardware, firmware, software, circuitry, collection of electrical devices, or a combination thereof.

The illustrative augmented reality scene generation platform 102 also may include an image database 104, a digital object database 106, and/or a guide reticle database 108, each of which may be stored in a memory 204 and/or data storage device 210 of the mobile image capture device 100 and/or accessed by one or more of the various components thereof. In some embodiments, the data stored in the respective databases as described herein might not be mutually exclusive. In other words, certain data described herein as being stored in one database may be stored in another database described herein, and/or in another database altogether. The data may be stored in a single database, and/or a distributed database/data storage arrangement.

The image data extractor 110 is configured to extract image data from the various sensors 114 of the mobile image capture computing device and/or from the captured images themselves, such as the FOV and/or intrinsic parameters of the camera sensor 214 (e.g., the focal length, imaging center, etc.). For example, the image data extractor 110 may be configured to extract image data from a camera sensor (e.g., the camera sensor 214) and/or sample position/orientation data (e.g., IMU data) from an IMU sensor (e.g., the IMU sensor 216).

The visual alignment manager 112 is configured to generate a visual guide reticle for placement into an image in order to indicate the intersection of a digital object with a physical planar surface, or wall, to which the guide reticle is to be anchored, as well as the approximate height of the digital object relative to a known ground or reference plane in physical space. The illustrative visual alignment manager 112 may include a ground plane orientation determiner 114, a wall plane identifier 116, a guide reticle model generator 118, and/or a virtual tether manager 120. In some embodiments, data related to the digital object(s) (e.g., skin, texture, etc.) to be superimposed in the augmented reality scene may be stored in the digital object database 106. In some embodiments, data related to the guide reticle as described herein may be stored in the guide reticle database 108.

The ground plane orientation determiner 114 is configured to determine the approximate orientation and/or height of the mobile image capture device 100, or more particularly the camera sensor 214 of the mobile image capture device 100, relative to a ground or floor plane that is parallel to gravitational acceleration. The ground plane orientation determiner 114 may be configured to receive a direct measure of the three degrees of freedom (3DoF) position and/or orientation data between the imaging sensor and the ground plane approximate height and/or orientation of the imaging sensor relative to a gravitationally perpendicular ground plane (e.g., the ground plane 400 of FIG. 4). For example, perhaps in one or more scenarios including continuous image frames of a video stream, it may be presumed that updated pose estimates for the imaging sensor height and/or orientation relative to the ground plane are also provided along with each new video frame. In one or more such scenarios, the extracted image data and/or the aggregated position/orientation data may be stored in the image database 104.

The ground plane orientation determiner 114 may be configured to measure the rotational offset of the camera sensor 214 relative to the ground plane using other position tracking technologies and/or algorithms, such as simultaneous localization and mapping (SLAM) inside-out tracking. For example, the ground plane orientation determiner 114 may be configured to use SLAM to estimate the height of the camera sensor 214 relative to the ground plane at run time. As described previously, the ground plane orientation determiner can estimate a pose of the mobile image capture device 100, which can be considered to form a new coordinate system arbitrarily aligned in relation to the physical world.

Referring now to FIG. 4, an illustrative camera sensor 214 is shown in an arbitrary position and orientation relative to a ground plane 400. As illustratively shown, an imaging sensor aligned plane 404 intersects the ground plane 400 at an imaging/ground plane intersection 406. In other words, an imaging/ground plane intersection 406 is defined between the ground plane 400 and the camera sensor plane 404. An origin 402 (e.g., coordinate (0, 0, 0)) of a dimensional axes 416 lies at ground level directly below a center point 408 of the camera sensor 214 and runs parallel to the direction of Earth's gravitational force, illustrated by the gravitational direction vector 418. A first axis 410 of the dimensional axes 416 is formed by this same gravity aligned track. The second axis 412 of the dimensional axes 416 is orthogonal to the first axis 410 and parallel to the intersection 406. The third axis 414 of the dimensional axes 416 lies along the remaining direction orthogonal to the first axis 410 and the second axis 412.

Referring back to FIG. 1, the wall plane identifier 116 is configured to analyze the image to determine one or more available wall planes upon which a digital object may be overlaid. The wall plane identifier 116 may be configured to employ one or more line/plane detection computer vision algorithms on the image. For example, perhaps for example due to the absence of distance and/or geometric information of one or more, or each, planar wall surface, digital objects overlaid onto an image may (e.g., may likely) occlude the image content itself. For example, in one or more scenarios, perhaps no contextual information may be available for determining when the approximate scale and orientation of the digital object properly matches the visible orientation of the planar wall surface. In such scenarios, among others, the relative scale of a digital object can be the same when the digital object is rendered to appear closer to the camera sensor 214 (e.g., the digital object 506 superimposed on an image 500 in FIG. 5A) and when the digital object is rendered to appear further from the camera sensor 214 (e.g., the digital object 506 superimposed on the image 500 in FIG. 5B).

The guide reticle model generator 118 is configured to generate a model of a guide reticle which is usable to align a digital object relative to a wall plane and a ground plane. The guide reticle model generator 118 may be configured to approximate an intersection line between the wall plane and the ground plane. As described herein, the digital objects may obstruct at least a portion of an image on which they are superimposed due to a lack of geometrical information about the augmented reality scene. Perhaps as a result of this obstruction, among other scenarios, additional contextual information may be useful (e.g., required) to determine when a digital object's position is correctly aligned with a planar wall surface.

Figure 6:
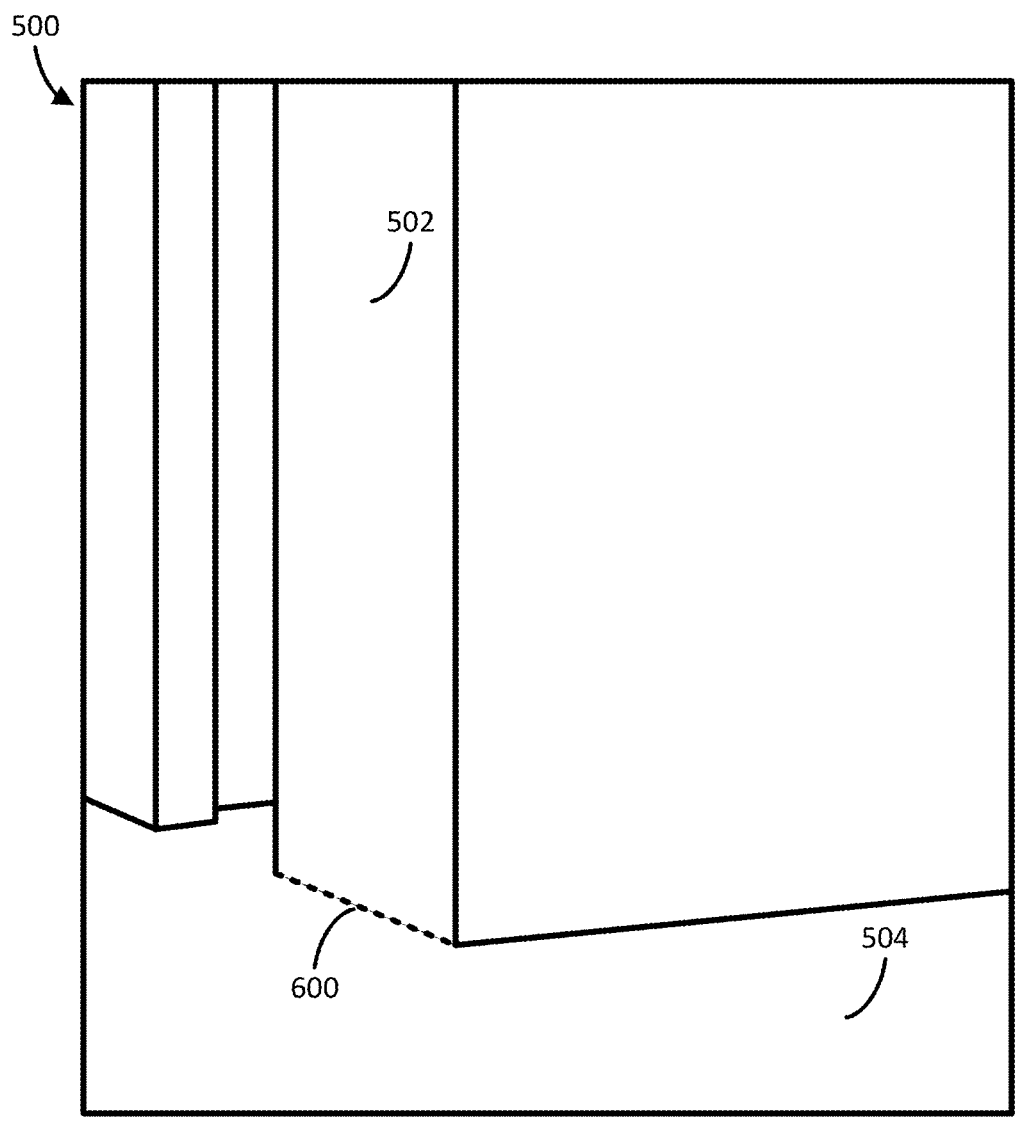
FIG. 6 is an illustration of an intersection line displayed at the intersection of a wall plane and a ground plane surfaces detected in an image.

Accordingly, the guide reticle model generator 118 is configured to approximate a height of the digital object relative to the ground plane (e.g., the planar wall 502 of FIGS. 5A and 5B) and approximate a distance from the camera sensor 214 to the wall plane, such that the approximated height and distance can be used to properly render the digital object (e.g., the digital object 506 of FIGS. 5A and 5B) at the same distance as the physical planar wall (e.g., the planar wall 502 of FIGS. 5A and 5B). The guide reticle model generator 118 may be configured to determine an intersection of the ground plane with the wall plane relative to the camera sensor 214 (e.g., the approximate intersection line 600). For example, referring now to FIG. 6, the illustrative image 500 of FIGS. 5A and 5B is shown in which an approximate intersection line 600, as indicated by the dashed line, is displayed at the intersection of the wall plane 502 and the ground plane 504.

Figure 7:
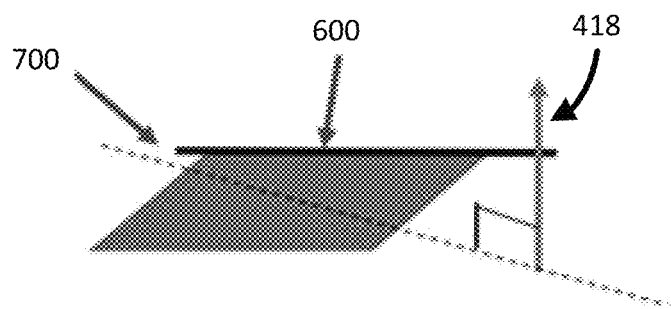
FIG. 7 is an illustration of a guide reticle which includes a ground-wall intersection line and a gravitational direction vector perpendicular to a computer generated depiction of the ground plane.

As described herein, the guide reticle model generator 118 may be configured to model the ground-wall intersection line, orientation and/or position, relative to the camera sensor 214 via a model (e.g., 3-dimensional computer generated imagery). The guide reticle model generator 118 may determine (e.g., may be useful to determine) the approximate orientation of the ground and/or wall planes relative to the camera sensor 214. Referring now to FIG. 7, an illustration of an example guide reticle components are shown. As illustratively shown, the example (e.g., basic) guide reticle components include the ground-wall intersection line 600 and the gravitational direction vector 418, which is perpendicular to the computer generated depiction of the ground plane 700.

Figure 8A:
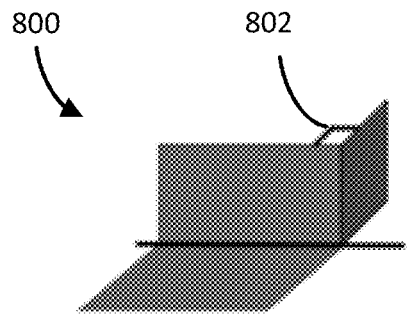
FIGS. 8A-8D are illustrations of different visual depictions of an intersection line and ground orientation information.
Figure 8B:
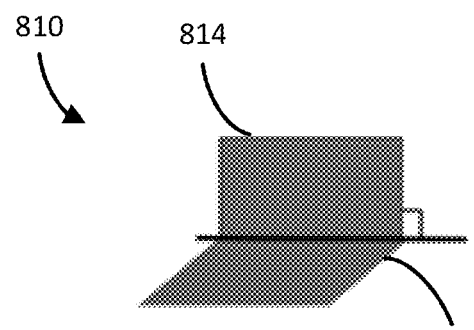
Figure 8C:
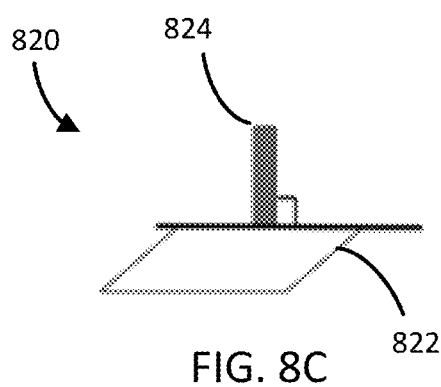
Figure 8D:
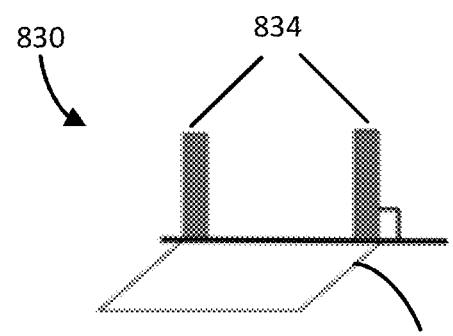

The guide reticle requirements may (e.g., may only) dictate that the intersection line and ground orientation information be provided. Accordingly, the visual depiction of intersection line and ground orientation information may be provided through various forms. Examples of such visual depictions include, but are not limited to, a guide reticle 800 with a 90 degree wall corner 802 as illustratively shown in FIG. 8A, a guide reticle 810 with a ground plane 812 and a single wall plane 814 as illustratively shown in FIG. 8B, a guide reticle 820 with a ground plane 822 and a narrow wall plane 824 as illustratively shown in FIG. 8C, and a guide reticle 830 with a ground plane 832 and a segmented wall plane 834 as illustratively shown in FIG. 8D. The illustrative guide reticle depictions in FIGS. 8A through 8D may be viewed from a fixed perspective and/or that the guide reticle may be itself a 3-dimensional digital object which can be viewed from and/or rotated at multiple angles.

The guide reticle model generator 118 is configured to generate the guide reticle model such that the guide reticle can be rendered with the perspectively correct projection sufficiently identical to the digital object being placed within the augmented reality scene. In other words, the guide reticle model generator 118 is configured to render the guide reticle such that the computer generated depiction of the ground plane appears at the approximate ground level, relative to the camera sensor 214. Perhaps for example if the guide reticle were to be rendered at various distances from the imaging sensor, among other scenarios, the ground-wall intersection line would remain to appear level with the ground plane within the image. As illustratively shown in FIG. 9A, an illustrative computer generated depiction of the ground plane 700 is shown in the scene 500 relative to the wall plane 502 of FIGS. 5A and 5B. Similarly, in FIG. 9B, an illustrative computer generated depiction of the ground plane 700 is shown in the scene 500 relative to another wall plane 900.

The virtual tether manager 120 is configured to manage a tether connecting the digital object and the guide reticle. Perhaps for example using (e.g., using only) the image and/or the determined camera sensor pose relative to the ground plane, it may not be explicitly possible to directly overlay the guide reticle at the ground-wall intersection of a user's choice. However, using line and plane detection computer vision algorithms make it possible to identify potential candidates for digital object alignment. Accordingly, the virtual tether manager 120 may be configured to determine, one or more, or a number of, wall planes in the image as potential candidates for digital object alignment.

In some scenarios, it may not be known which wall plane is desired for anchoring the digital object(s) at a given time for a given augmented reality scene, for example in the instance in which multiple wall planes occur within the image (e.g., the wall plane 502 and the wall plane 900 of FIG. 9B). The ground-wall plane intersection line may be obstructed by other physical objects within the image. The virtual tether manager 120 may be configured to supply a mechanism for manual placement of the guide reticle onto the desired location of ground-wall intersection.

Figure 10C:
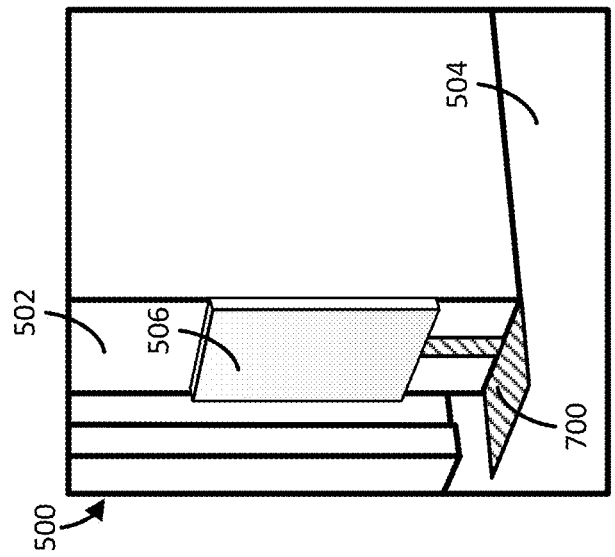
FIGS. 10A-10C are illustrative representations of a digital object placed relative to a physical wall in an augmented reality scene.
Figure 10B:
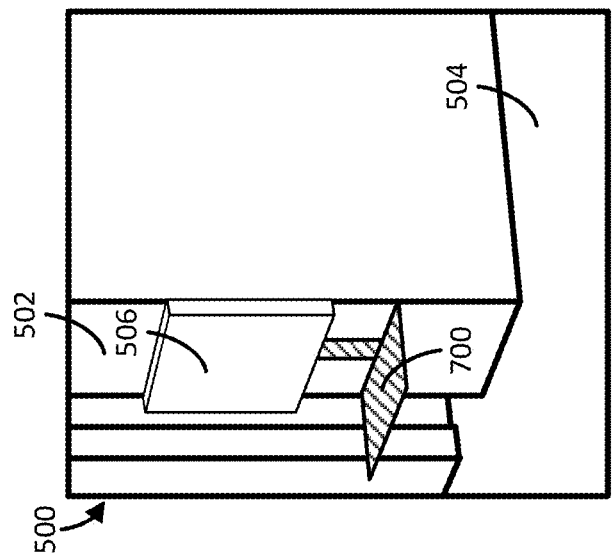
Figure 10A:
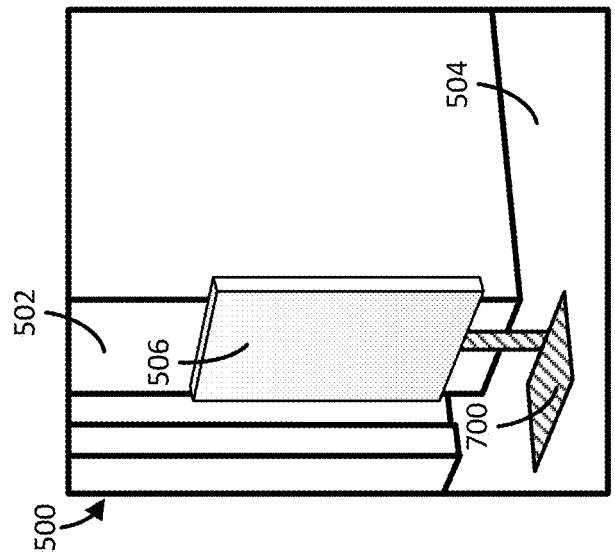

The virtual tether manager 120 may be configured to display a virtual tether between the guide reticle and the digital object to be placed, such that the virtual tether "anchors" the digital object to the guide reticle. The ground reticle can be translated and rotated along the ground plane and the digital object can also be reoriented in the same manner. The virtual tether manager 120 is further configured to use the virtual tether to provide an indication of the height of the digital object above the ground plane. As illustratively shown in FIGS. 10A-10C, using the guide reticle and virtual tether, it is apparent that the digital object placement is illustratively shown beyond the distance to the physical wall in FIG. 10B and too close to the camera sensor (not shown) in FIG. 10A. As illustratively shown in FIG. 10C, the digital object and guide reticle are displayed at the correct placement within the augmented reality scene such that the digital object aligns with the wall plane. In some embodiments, placement of the guide reticle and virtual tether can be performed at run-time.

One or more techniques may be used to display more than one guide reticle, perhaps for example denoting the intersections of the ground plane with multiple walls, and/or multiple locations along the wall(s). One or more, or multiple guide reticles may be used to allow adjustment of one or more, or multiple, digital objects that may (e.g., may each) be attached to one or more guide reticles and/or virtual tethers. One or more, or multiple, guide reticles may be used to denote intersections of a vertical wall with respect to one or more, or multiple, horizontal planes, such as table tops, stool tops, chair tops, and/or floor and/or ground planes, etc.

Figure 11:
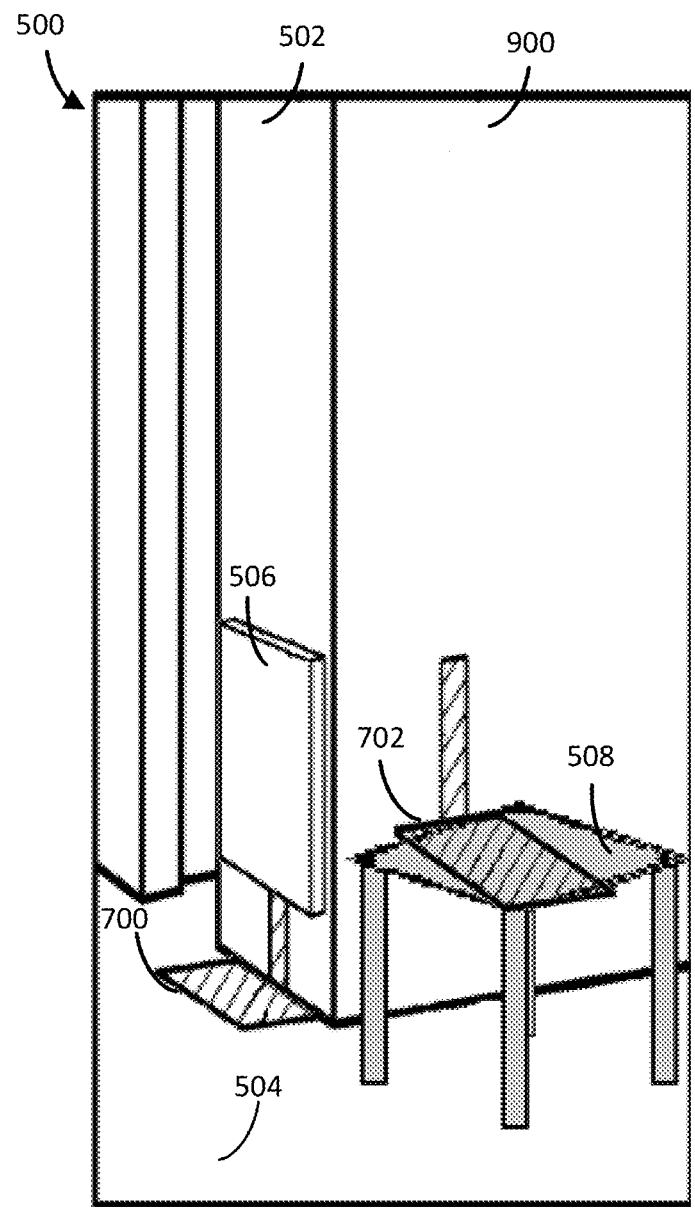
FIG. 11 is an illustrative representation of more than one digital object placed relative to more than one physical wall in an augmented reality scene.

Referring to FIG. 11, an illustrative computer generated depiction of the ground plane 700 is shown in the scene 500 relative to the wall plane 502 for digital object 506 (e.g., a painting, a television monitor, a lamp sconce, etc.). Also in FIG. 11, an illustrative computer generated depiction of a horizontal plane 702 is shown relative to the wall plane 900 for digital object 508. For example, the horizontal plane 702 is coplanar with the horizontal surface of digital object 508 (e.g., a table).

One or more techniques may be used to adjust/control a digital object relative to one or more other digital objects. For example, a guide reticle may be used to display the intersection of a digital object surface (e.g., a table top) with respect to another digital object anchored to the guide reticle via a virtual tether. One or more techniques may be used, for example, to limit the interaction between digital objects based on specified criteria. This criteria may limit interactions between one or more digital objects that may be (e.g., reasonably) intended to be anchored relative to specific/certain/predetermined one or more other objects. For example, one or more techniques may interpret the criteria (e.g., that may be included via metadata corresponding the digital object(s)) to apply a restriction such that a table mounted object may be (e.g., may only be) anchored to a table top, and not anchored to the ground/floor/carpet and/or wall or wall plane.

Figure 12A:
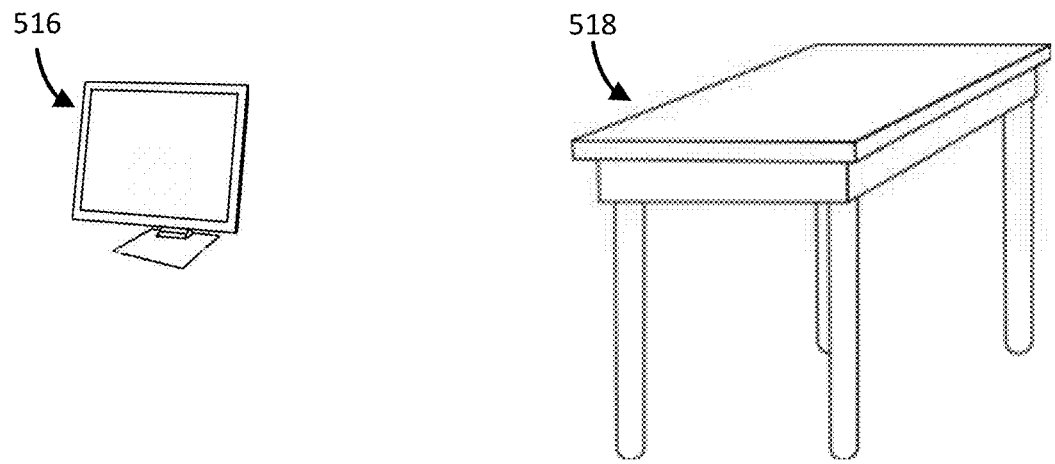
FIGS. 12A-12B are illustrative representations of an association technique of a digital object with one or more other digital objects.
Figure 12B:
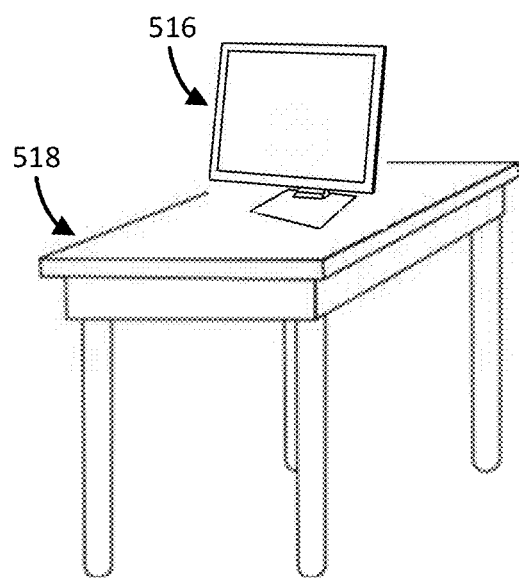

FIGS. 12A-12B illustrate an example use of guide reticle(s) for an interaction control between one or more, or multiple digital objects. FIG. 12A illustrates representations of a digital desktop display screen 516 and a digital table 518 at arbitrary poses not relative to one another. FIG. 12B illustrates representations of the digital desktop display 516 and the digital table 518 with poses relative to one another. For example, FIG. 12B illustrates the successful result (e.g., an allowed placement based on the interaction control, permissible, valid, etc.) of a user (e.g. a user's input) placing the digital desktop display 516 relative to the top of the digital table 518.

FIGS. 13A-13C illustrate an example use of guide reticle(s) for an interaction control between one or more, or multiple digital objects. FIG. 13A illustrates representations of a digital desktop display screen 516 and a digital chair 520 at arbitrary poses not relative to one another. FIG. 13B illustrates representations of the digital desktop display 516 and the digital chair 520 with poses relative to one another. FIG. 13C illustrates representations of the digital desktop display 516 and the digital chair 520 back at the arbitrary poses of FIG. 13A not relative to one another. For example, FIG. 13C illustrates the unsuccessful result (e.g., a disallowed placement based on the interaction control, impermissible, invalid, etc.) of a user (e.g., a user's input) placing the digital desktop display 516 relative to the seat plane of the digital chair 520.

In some embodiments, the augmented reality scene generation platform 102 may be deployed on a separate computing device remotely located to the mobile image capture computing device 100. In some embodiments, at least a portion of the functions of the augmented reality scene generation platform 102 as described herein may be performed on/by another computing device, such as, but not limited to, a serially connected computing device or one or more cloud-based server(s).

Figure 3:
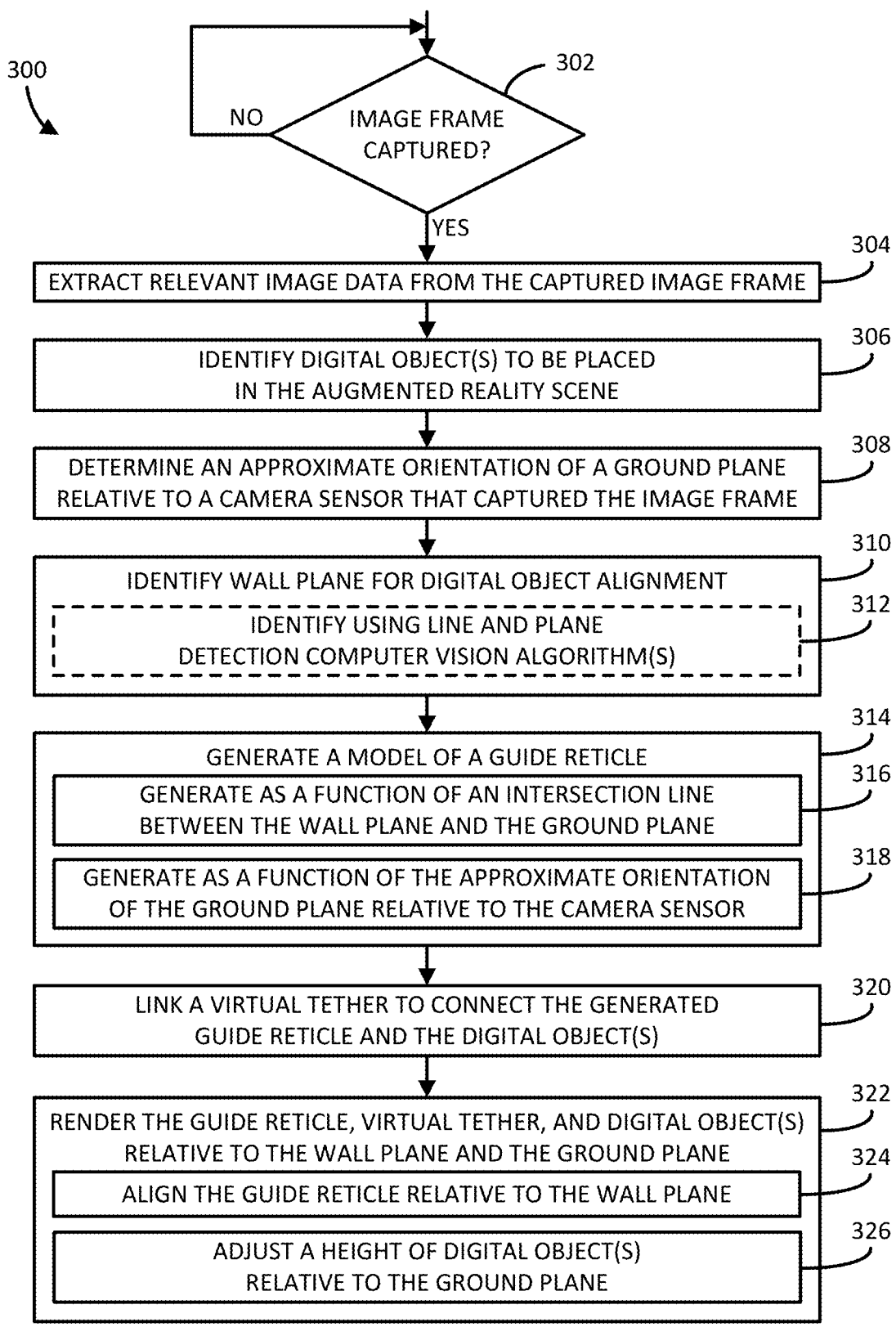
FIG. 3 is a simplified flow diagram of at least one embodiment of a method for anchoring computer generated objects within an augmented reality scene that may be executed by the augmented reality scene generation platform.

Referring now to FIG. 3, in use, the mobile image capture device 100 may execute a method 300 for anchoring computer generated objects within an augmented reality scene relative to the mobile image capture device 100, or more particularly the augmented reality scene generation platform 102 may execute the method 300 relative to an image capturing sensor (e.g., the camera sensor 214 of the illustrative mobile image capture device 100 of FIG. 2). In some embodiments, the method 300 may be embodied as various instructions stored on a computer-readable media, which may be executed by a processor (e.g., the processor 200) and/or other components of the mobile image capture device 100 to cause the mobile image capture device 100 to perform the method 300. The computer-readable media may be embodied as any type of media capable of being read by the mobile image capture device 100 including, but not limited to, the memory 204, the data storage device 210, other memory or data storage devices of the mobile image capture device 100, portable media readable by a peripheral device of the mobile image capture device 100, and/or other media.

The method 300 begins in block 302, in which the mobile image capture device 100 determines whether an image frame has been captured by the camera sensor. If so, the method 300 advances to block 304, in which the mobile image capture device 100 extracts relevant image data from the captured image frame. In block 306, the mobile image capture device 100 identifies one or more digital objects to be placed (e.g., superimposed) in the augmented reality scene of the captured image frame. In block 308, the mobile image capture device 100 determines an approximate orientation of a ground plane relative to the camera sensor at a time which the image frame was captured.

In block 310, the mobile image capture device 100 identifies a wall plane for digital object alignment. In block 312, the mobile image capture device 100 may identify the wall plane using one or more line and plane detection computer vision algorithms, such as may be used on one or more properties of the image frame (e.g., color space values of the respective pixels of the image frame). The mobile image capture device 100 may identify more than one wall plane in block 310. In block 314, the mobile image capture device 100 generates a model of a guide reticle. In block 316, the mobile image capture device 100 generates the model of the guide reticle as a function of an intersection line between the identified wall plane and the ground plane (e.g., the ground-wall intersection line). In block 318, the mobile image capture device 100 generates the model of the guide reticle as a function of the approximate orientation of the ground plane relative to the imaging sensor.

In block 320, the mobile image capture device 100 links a virtual tether to connect the generated guide reticle one or more of the digital objects to be superimposed in the augmented reality scene. In block 322, the mobile image capture device 100 renders (e.g., to a display of the mobile image capture device 100 or another render/display computing device) the guide reticle, the virtual tether, and/or the one or more of the digital objects to be superimposed in the augmented reality scene. In block 324, the mobile image capture device 100 aligns the guide reticle relative to the wall plane. In block 326, the mobile image capture device 100 adjusts a height of one or more of the digital objects relative to the ground plane.

The augmented reality rendering system in which the augmented reality scene generation platform 102 is deployed may (e.g., should) also possess a rendering engine or pipeline capable of displaying both the captured image as well as computer generated content within a display. Further, the rendering pipeline may (e.g., should) be able to provide perspective rendering such that the computer generated content is able to appear at roughly an identical scale and/or proportion to real objects present within the image. The rendering computing device within the rendering pipeline may (e.g., should) be able to match as closely as (e.g., reasonably) possible the intrinsic properties of the associated camera sensor of the mobile image capture computing device (e.g., the mobile image capture computing device 100 of FIG. 1).

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for anchoring computer generated objects within an augmented reality scene, the method comprising:
   capturing, by a mobile image capture computing device, an image frame via a camera sensor of the mobile image capture computing device;
   determining, by the mobile image capture computing device, a ground plane of the image frame;
   identifying, by the mobile image capture computing device:
      a first wall plane of the image frame; and
      a second wall plane of the image frame;
   generating, by the mobile image capture computing device:
      a model of a first guide reticle; and
      a model of a second guide reticle;
   linking, by the mobile image capture computing device:
      a first virtual tether connecting the first guide reticle to a first digital object to be rendered relative to first the guide reticle; and
      a second virtual tether connecting the second guide reticle to a second digital object to be rendered relative to the second guide reticle;
   determining, by the mobile image capture computing device, a surface plane of a surface of the second digital object; and
   rendering, by the mobile image capture computing device:
      the first guide reticle and the first virtual tether to a display of the mobile image capture computing device relative to the first wall plane and the ground plane;
      the second guide reticle and the second virtual tether to the display relative to the second wall plane and the surface plane;
      the first digital object to the display relative to the first guide reticle and the first virtual tether; and
      the second digital object to the display relative to the second guide reticle and the second virtual tether.

2. The method of claim 1, wherein the rendering the first guide reticle relative to the first wall plane comprises aligning the first guide reticle relative to the first wall plane.

3. The method of claim 1, wherein the determining the ground plane of the image frame comprises identifying an approximate orientation of the ground plane relative to the camera sensor at a time at which the image frame was captured.

4. The method of claim 1, wherein the rendering the first guide reticle relative to the first wall plane comprises adjusting a height of the first digital object relative to the ground plane.

5. The method of claim 1, further comprising determining an intersection line between the first wall plane and the ground plane, wherein the generating the model of the first guide reticle comprises generating the model of the first guide reticle as a function of the intersection line.

6. The method of claim 1, wherein the identifying the first wall plane of the image frame comprises identifying the first wall plane as a function of one or more line and plane detection computer vision algorithms on data of the image frame.

7. The method of claim 1, further comprising:
   receiving, by the mobile image capture computing device, input to render the first digital object in connection with the surface plane to the display;
   determining, by the mobile image capture computing device, that the rendering of the first digital object in connection with the surface plane to the display is at least one of: permissible, or impermissible; and
   rendering, by the mobile image capture computing device, the first digital object in connection with the surface plane to the display upon a permissible determination.

8. The method of claim 7, wherein the determining, by the mobile image capture computing device, that the rendering of the first digital object in connection with the second digital object is at least one of: permissible, or impermissible, is based on information corresponding to at least one of: the first digital object, or the second digital object.

9. A device that captures mobile images, the device comprising:
- a memory;
- a display;
- a camera sensor; and
- a processor, the processor configured at least to:
  - capture an image frame via the camera sensor;
  - determine a ground plane of the image frame;
  - identify:
    - a first wall plane of the image frame; and
    - a second wall plane of the image frame;
  - generate:
    - a model of a first guide reticle; and
    - a model of a second guide reticle;
  - link:
    - a first virtual tether to connect the first guide reticle to a first digital object to be rendered relative to the first guide reticle; and
    - a second virtual tether connecting the second guide reticle to a second digital object to be rendered relative to the second guide reticle;
  - determine a surface plane of a surface of the second digital object; and
  - render:
    - the first guide reticle and the first virtual tether to the display relative to the first wall plane and the ground plane;
    - the second guide reticle and the second virtual tether to the display relative to the second wall plane and the surface plane;
    - the first digital object to the display relative to the first guide reticle and the first virtual tether; and
    - the second digital object to the display relative to the second guide reticle and the second virtual tether.

10. The device of claim 9, wherein the processor is further configured to align the first guide reticle relative to the first wall plane.

11. The device of claim 9, wherein the processor is further configured to identify an approximate orientation of the ground plane relative to the camera sensor at a time at which the image frame was captured.

12. The device of claim 9, wherein the processor is further configured to adjust a height of the first digital object relative to the ground plane.

13. The device of claim 9, wherein the processor is further configured to:
- determine an intersection line between the first wall plane and the ground plane; and
- generate the model of the first guide reticle as a function of the intersection line.

14. The device of claim 9, wherein the processor is further configured to identify the first wall plane as a function of one or more line and plane detection computer vision algorithms on data of the image frame.

15. The device of claim 9, wherein the processor is further configured to:
- receive input to render the first digital object in connection with the surface plane to the display;
- determine that the rendering of the first digital object in connection with the surface plane to the display is at least one of: permissible, or impermissible; and
- render the first digital object in connection with the surface plane to the display upon a permissible determination.

16. The device of claim 15, wherein the processor is further configured such that the determination that the rendering of the first digital object in connection with the second digital object is at least one of: permissible, or impermissible, is based on information corresponding to at least one of: the first digital object, or the second digital object.

* * * * *